United States Patent
Li et al.

(10) Patent No.: US 9,630,157 B2
(45) Date of Patent: Apr. 25, 2017

(54) LIQUID STIRRING APPARATUS AND METHOD OF USING TO CREATE A FROTH

(71) Applicant: TOP ELECTRIC APPLIANCES INDUSTRIAL LTD, Guangzhou, Guangdong (CN)

(72) Inventors: Weizhong Li, Guangzhou (CN); Yewu Zhong, Guangzhou (CN)

(*) Notice: Subject to any disclaimer, the term of this patent is extended or adjusted under 35 U.S.C. 154(b) by 204 days.

(21) Appl. No.: 14/421,837

(22) PCT Filed: Sep. 10, 2013

(86) PCT No.: PCT/CN2013/083212
§ 371 (c)(1),
(2) Date: Feb. 15, 2015

(87) PCT Pub. No.: WO2014/036973
PCT Pub. Date: Mar. 13, 2014

(65) Prior Publication Data
US 2015/0190768 A1 Jul. 9, 2015

(30) Foreign Application Priority Data

Sep. 10, 2012 (CN) .......................... 2012 1 0331598
Sep. 13, 2012 (CN) .......................... 2012 1 0337461

(51) Int. Cl.
*B01F 7/16* (2006.01)
*B01F 3/04* (2006.01)
(Continued)

(52) U.S. Cl.
CPC .......... *B01F 7/1695* (2013.01); *A23C 9/1524* (2013.01); *A47J 43/0465* (2013.01);
(Continued)

(58) Field of Classification Search
CPC ........ A47J 43/0465; B01F 2015/00603; B01F 2215/0006; B01F 7/1695; B01F 13/089;
(Continued)

(56) References Cited

U.S. PATENT DOCUMENTS 3,888,466 A * 6/1975 Sedam .................. B01F 13/089
222/226
4,199,265 A * 4/1980 Sanderson .......... B01F 13/0818
366/274
(Continued)

FOREIGN PATENT DOCUMENTS

CN         201871348     *    6/2011
CN         202366643  A1       8/2012
(Continued)

OTHER PUBLICATIONS

English Translation for CN202366643 published Aug. 2012.*
(Continued)

*Primary Examiner* — Anthony Weier (57) ABSTRACT

Provided is a liquid stirring apparatus of the type using a non-contact drive mechanism (4) where the stirrer is driven through a magnetic drive effect without a mechanical connection member intruding through a wall of a container (2) for receiving a liquid to be stirred. The stirrer is received in use within the container (2). The non-connect driving mechanism (4) is arranged externally of the container (2). A holder is provided for positioning the stirrer within the container (2) where the holder is not integrally formed with the container (2), but is a separate component therefrom. The holder is not affixed to the container (2), but locates within the container (2) such that it positions the stirrer adjacent a wall of the container (2) near to the external location of the non-contact drive mechanism (4). The holder is manually
(Continued)

removable from the container (2) and the stirrer is manually removable from the holder for cleaning.

18 Claims, 7 Drawing Sheets

(51) Int. Cl.
*A23C 9/152* (2006.01)
*B01F 13/08* (2006.01)
*A47J 43/046* (2006.01)
*B01F 15/00* (2006.01)

(52) U.S. Cl.
CPC ...... *B01F 3/04439* (2013.01); *B01F 3/04453* (2013.01); *B01F 3/04808* (2013.01); *B01F 13/089* (2013.01); *B01F 13/0827* (2013.01); *B01F 2015/00603* (2013.01); *B01F 2215/0006* (2013.01)

(58) Field of Classification Search
CPC .............. B01F 13/0827; B01F 3/04439; B01F 3/04453; B01F 3/04808; A23C 9/1524
See application file for complete search history.

(56) References Cited

U.S. PATENT DOCUMENTS

| | | | | |
|---|---|---|---|---|
| 2003/0053371 | A1* | 3/2003 | Schoeb | ............... B01F 13/0827 366/273 |
| 2014/0047985 | A1* | 2/2014 | Chen | ................... A47J 43/0465 99/453 |

FOREIGN PATENT DOCUMENTS

| | | |
|---|---|---|
| CN | 202844945 A1 | 4/2013 |
| CN | 202893266 A1 | 4/2013 |
| SU | 1586758 A1 | 8/1990 |

OTHER PUBLICATIONS

English Translation for CN201871348 published Jun. 2011.*
English Translation for SU1586758 published Aug. 1990.*
The State Intellectual Property Office, the P.R. China (SIPO), International Search Report for international patent application PCT/CN2013/083212, Dec. 19, 2013, pp. 1-3, SIPO.

* cited by examiner

LIQUID STIRRING APPARATUS AND METHOD OF USING TO CREATE A FROTH

TECHNICAL FIELD

The invention relates to a liquid stirring apparatus and particularly, but not exclusively, to a liquid stirring apparatus for frothing milk or a milk based food liquid.

BACKGROUND ART

Some commercially available liquid stirring apparatuses contain stirring heads fixed to the container lids by means of drive shafts or the like whilst others have stirring heads fixed to the container bottoms by drive shafts or the like.

A stirring apparatus with a stirring head fixed to the container lid by a drive shaft usually requires that the driving means is disposed on the container lid. This type of structure has at least three disadvantages: first, the container lid is heavy and is not easy to open or close; secondly, a user touching the vessel lid may get an electric shock if the liquid in the container has overflowed or splashed onto the container lid by boiling or high speed rotation of the stirring head; thirdly, it is not easy to wash the stirring head because it is fixed on stirring hear drive shaft of the container lid, and a gap between the stirring head and the drive shaft is difficult to clean.

In the other kind of liquid stirring apparatus having a stirring head fixed to the container bottom by the stirrer head drive shaft, the shaft or mechanism connecting the shaft to the driving means extends through the container bottom into the interior of the container. This type of structure has at least three disadvantages: first, the process for manufacturing the shaft or shaft connecting mechanism of the driving means is complicated, especially the necessary sealing arrangement for the drive shaft in the container bottom which can be very complicated, and the requirement that the material of the seal must be capable of withstanding high temperatures considering the liquid in the container may be heated to boiling point; secondly, it is not easy to wash the part of the container bottom where the stirrer hear drive shaft or connecting rod passes through; thirdly, it is not easy to wash the stirring head as it is fixed on the bottom connecting rod or shaft, and the gap between the stirring head and the connecting rod or shaft is difficult to clean.

WO2006/050900 entitled "Appliance and method for preparing a froth from a food liquid" discloses that the rotatable stirrer is positioned in a tank, i.e. container, by a positioning means. The positioning means is a protrusion or a depression comprising an integrally formed moulded wall at the bottom of the tank. This disclosure also describes a magnetic drive mechanism which does not require a mechanical connection to the stirrer to drive it. With a positioning means comprising a protrusion or a depression in the bottom wall of the container, there are at least three disadvantages with this kind of structure: first, as the protrusion or depression is for locating the stirrer, the shape thereof is very precise, which cannot be easily produced by punching a recess or bulge in the vessel wall, the manufacture process is therefore made more complicated; secondly, it is difficult to wash the protrusion or the depression; thirdly, the stirring head may slip off of the protrusion or depression when it is rotating at high speed.

DISCLOSURE OF INVENTION

Technical Problem

An object of the invention is to mitigate or obviate to some degree one or more problems associated with known liquid stirring apparatuses.

The above object is met by the combination of features of the main claims; the subclaims disclose further advantageous embodiments of the invention.

Another object of the invention is to provide an improved liquid stirring apparatus of the type using a non-contact drive mechanism.

Another object of the invention is to provide a liquid stirring apparatus of the type using a non-contact drive mechanism where a bottom of the container of such an apparatus is substantially flat over its whole surface.

One skilled in the art will derive from the following description other objects of the invention. Therefore, the foregoing statements of object are not exhaustive and serve merely to illustrate some of the many objects of the present invention.

SOLUTION TO PROBLEM

Technical Solution

The present invention provides a liquid stirring apparatus of the type using a non-contact drive mechanism where the stirrer is driven through a magnetic drive effect without a mechanical connection member intruding through a wall of a container for receiving a liquid to be stirred. The stirrer is received in use within the container. The non-contact driving mechanism is arranged externally of the container. A holder is provided for positioning the stirrer within the container where the holder is not integrally formed with the container, but is a separate component therefrom. The holder is preferably not permanently affixed to the container, but locates within the container such that it positions the stirrer adjacent a wall of the container near to the external location of the non-contact drive mechanism. The holder is manually removable from the container and the stirrer is manually removable from the holder for cleaning or other purposes.

In a first main aspect, the present invention provides a liquid stirring apparatus, comprising: a container for receiving a liquid to be stirred; a stirrer received within the container; a non-contact driving mechanism arranged externally of the container for driving the stirrer; and a holder for positioning the stirrer within the container; wherein the holder is not integral with the container.

In a second main aspect, the present invention provides a method for preparing a froth from milk or a milk-based food liquid in an appliance according to the first main aspect of the invention, the method comprising driving the stirrer by a magnetic drive effect.

The summary of the invention does not necessarily disclose all the features essential for defining the invention; the invention may reside in a sub-combination of the disclosed features.

BRIEF DESCRIPTION OF DRAWINGS

Description of Drawings

The foregoing and further features of the present invention will be apparent from the following description of preferred embodiments which are provided by way of example only in connection with the accompanying figures, of which.

MODE FOR THE INVENTION

Mode for Invention

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The liquid stirring apparatus in accordance with the invention comprises a container for receiving a liquid to be stirred, a stirrer received within the container and a non-contact driving mechanism arranged externally of the container for driving the stirrer. A holder for positioning the stirrer within the container is provided where the holder is not integral with the container. This simplifies the manufacture of the apparatus as it negates any special step of forming a recess or relief in a bottom wall of the container for positioning the stirrer.

The non-contact driving mechanism drives the stirrer through a magnetic drive effect such that no mechanical connection through a wall of the container between the driving mechanism and the stirrer is required. In preferred embodiments, the non-contact driving mechanism comprises an axially oriented magnetic drive as this arrangement of magnetic driving mechanism enables torque to be efficiently transferred through a flat surface such as a bottom wall of the container.

The holder is formed as a separate component from the container and is preferably not permanently affixed to the container, but is manually removable therefrom for cleaning, etc. In preferred embodiments, the holder positions the stirrer adjacent a bottom wall of the container near to the driving mechanism which is positioned below the bottom wall of the container. In its simplest form, the holder may comprise a support surface located between the stirrer and the bottom wall of the container. This has the advantage that rotation of the stirrer does not wear the bottom wall of the container. The holder can be easily replaced if it becomes worn as it is made separately from the container. In view of this, it is an advantage of all embodiments of the present invention that none require a deformed wall portion of the container comprising a recess or relief associated with the driving mechanism and furthermore enables the bottom wall of the container to be substantially flat over its whole surface.

The stirrer is preferably manually removable from the holder for cleaning and, if necessary, replacement.

In one embodiment, the holder is attached to a lid of the container and extends downwardly therefrom into the container to support the stirrer adjacent the bottom of the container.

In another embodiment, the holder is separate from the lid. Preferably, in this embodiment, the holder engages the lid when the holder is positioned within the container and the lid is placed on the container.

In any of the embodiments, the holder has at least one member spaced outwardly therefrom which engages a wall of the container in order to position the stirrer within the container. Preferably, the holder has a plurality of members extending radially outwardly therefrom which each engaging a cylindrical side wall of the container in order to position the stirrer within the container at a predetermined position adjacent a bottom wall of the container. In such arrangements, there may be no need for the holder to be attached to or to engage with the lid as the at least one member or the plurality of members may be sufficient by themselves to stably position the stirrer in the container even when the stirrer is being driven. In one embodiment, a circumferential contact member links the free ends of the plurality of radiating holder members whereby the circumferential member engages the full circumference of a cylindrical side wall of the container. In such an arrangement, a circumferential recess may be formed in the cylindrical side wall near its junction with the bottom wall.

A bottom surface of the holder may have one or more anti-slip pads affixed thereto which contact the bottom wall of the container to reduce movement of the holder when the stirrer is being driven by the driving mechanism.

In some embodiments, the stirrer may be retained in position within the holder by a magnetic attraction between the stirrer and the holder. The arrangement may be such that one of the stirrer or the holder has a magnet and the other of the stirrer or the holder has another magnet or a magnetic material element whereby magnetic attraction between the magnets or between the magnet and magnetic material element retains the stirrer in the holder. This assists in positioning the stirrer in the container at the correct position when the holder is lowered into the container as the stirrer is magnetically held within the holder as it is being lowered.

In other embodiments, in addition to the foregoing magnetic attraction or as an alternative to it, the stirrer may be retained in position within the holder by at least one depression/protrusion on a part of the holder and a corresponding protrusion/depression in a middle of a surface of the stirring head which engages the depression/protrusion of the holder wall.

In other embodiments, in addition to the foregoing magnetic attraction or as an alternative to it, the stirrer may be retained in position within the holder by two or more protrusions extending downwardly of a part of the holder, the stirrer having a shaft, the protrusions being disposed around the outside the shaft. The stirring head may have a stirring ring in addition to the shaft such that the protrusions are disposed inside of the stirring ring and outside of the stirring shaft.

The bottom of the stirrer is preferably shaped to make minimal contact with either a top surface of the bottom wall of the container or a top surface of a bottom wall of the holder upon which the stirrer is supported when it is rotating.

The stirrer may have at least one drive magnetic element or drive magnetic material element to enable the driving mechanism to cause said stirrer to rotate by a magnetic drive effect. In such an arrangement, a strength of a magnetic attraction between the drive mechanism and the stirrer may be the same or greater than a strength of an opposing magnetic attraction between the stirrer and the holder. It may be such that, when the holder is lowered into the container to reach the bottom, the magnetic attraction force of the drive mechanism overcomes or balances that of the opposing magnetic attractive force such that the stirrer moves away from an upper part of the holder whilst still being retained by the holder. The opposing magnetic attraction forces may be close to balance such that the stirrer is close to being driven in rotation in an almost floating, frictionless state within the holder.

The apparatus of the present invention is both easier to manufacture than known liquid stirring apparatuses, is easier to clean, and easier to replace worn or broken parts. Other advantages include that:

the liquid stirring apparatus of the present invention is safe to use because the stirring head is neither fixedly connected with the bottom of the container, nor is it fixedly connected with the holder such that the stirring head can be removed out of the container when being washed, on the other hand where the holder attaches to the container lid, it may be easily removed from the container and easy to wash;

the stirring head is not in contact with either the bottom of the container or the bottom of the holder when being driven to rotate, thereby the stirring head experiences much less friction when rotating, and efficiency is improved;

the liquid stirring apparatus has a wide range of application, can meet different requirements of rotating speeds for various liquids. It can not only be used for liquid frothing, but also be used for mixing fruit juice, soybean milk and the like; and when cleaning the liquid stirring apparatus, the stirring head may be easily removed from the holder.

It will be understood that the liquid stirring apparatus of the present invention is universally applicable for stirring all kinds of liquids.

Referring now to the drawings, the preferred embodiments of the suspension type liquid stirring apparatus of the present invention will be explained below in detail with reference to FIGS. 1 to 8.

Referring firstly to FIGS. 1 to 4, a suspension type liquid stirring apparatus according to this embodiment comprises: a housing 1, a container 2, a container lid 3, a driving means or mechanism 4, a holder in the form of a suspension means 6, a stirring head 5, wherein the driving means 4 is arranged under the container 2, the suspension means 6 and the stirring head 5 are disposed inside the container 2, the stirring head 5 is positioned inside the container 2 by means of the suspension means 6, wherein the apparatus further comprises an anti-friction bottom part 7 arranged between the stirring head 5 and the bottom of the container 2 so that the stirring head 5 does not wear out the bottom of the container 2 when the suspension type liquid stirring apparatus operates and the stirring head 5 rotates at high speed.

The suspension type liquid stirring apparatus of this embodiment further comprises an anti-friction bottom bracket 8 coupled to the suspension means 6 and the anti-friction bottom part 7 is positioned inside the container 2 by means of the anti-friction bottom bracket 8 and the suspension means 6.

In this embodiment, there is a positioning means 9 located between the suspension means 6 and the stirring head 5, wherein the stirring head is positioned inside the container 2 by the positioning means 9.

In this embodiment, the positioning means 9 consists of two or more protrusions 9.1 around the lower end of the suspension means 6, the stirring head 5 includes a stirring ring 5.1 and a stirring shaft 5.2 therein, the protrusions 9.1 being disposed inside of the stirring ring 5.1 and outside the stirring shaft 5.2.

In another embodiment, the positioning means 9 consists of male and female structures between the middle of the lower end of the suspension means 6 and the middle of the top of the stirring head 5, wherein there is one depression/protrusion 9.1 in the middle of the lower end of the suspension means 6 interfitting with a corresponding protrusion/depression 9.2 in the middle of the top of the stirring head.

In this embodiment, there is one magnet means (or magnetic material element) at the lower end of the suspension means 6 and one at the top of the stirring head 5 respectively, wherein the suspension means 6 and the stirring head 5 are coupled and positioned by means of the magnetic interaction between the magnet means 6.1 and the magnet means 5.3 thereof. It will be appreciated that, whilst the magnet means 6.1 and 5.3 may both comprise magnets, in some arrangements one of this pair may comprise a magnet and the other a suitable magnetic material element or member.

As a result, the suspension means 6 and the stirring head 5 are coupled and positioned not only by the magnetic interaction between the magnet means 6.1 and the magnetic means 5.3, but also by means of the mechanical positioning means 9 between the suspension means 6 and the stirring head 5. As the suspension type liquid stirring apparatus operates with the stirring head 5 rotating at a constant speed, it is sufficient that the suspension means 6 and the stirring head 5 be coupled together and positioned by means of the magnetic interaction between the magnet means 6.1 and 5.3. However, as the suspension device 6 and the stirring head 5 may swing irregularly whilst being washed by liquid, it may not be sufficient that the suspension means 6 and the stirring head 5 are only coupled together and positioned by means of the magnetic interaction between the magnet means 6.1 and 5.3. It may be necessary that the suspension means 6 and the stirring head 5 are coupled together and positioned by the mechanical means 9.1, 9.2 of the positioning means 9.

Furthermore, as the suspension means 6 and the stirring head 5 are coupled together and positioned by the mechanical means of the positioning means 9, the stirring head 5 will not be in contact with either the bottom of the container 2 or the suspension means 6 or the mechanical positioning means 9 when rotating, thereby the stirring head 5 experiences less friction when rotating, and efficiency of operation is improved.

In another embodiment, there is no magnetic element arranged at the lower part of the suspension means 6 or the top of the stirring head 5, and the suspension means 6 and the stirring head 5 are merely coupled and positioned by the mechanical positioning means 9 of the suspension means 6 and the stirring head 5. The suspension means 6 and the stirring head 5 are positioned by means of the mechanical positioning means 9 thereof when the suspension type liquid stirring apparatus operates with the stirring head 5 rotates.

In this embodiment, there is at least one magnet means at the top of the driving means 4 and at least one at the lower end of the stirring head 5 respectively, wherein the stirring head 5 is driven by the magnetic force of the magnet means 4.1 of the driving means 4 and the magnet means 5.4 of the stirring head 5, and the stirring head is positioned thereby and by means of the magnetic force of the magnet means 6.1 at the lower end of the suspension means 6.

Figure 1:
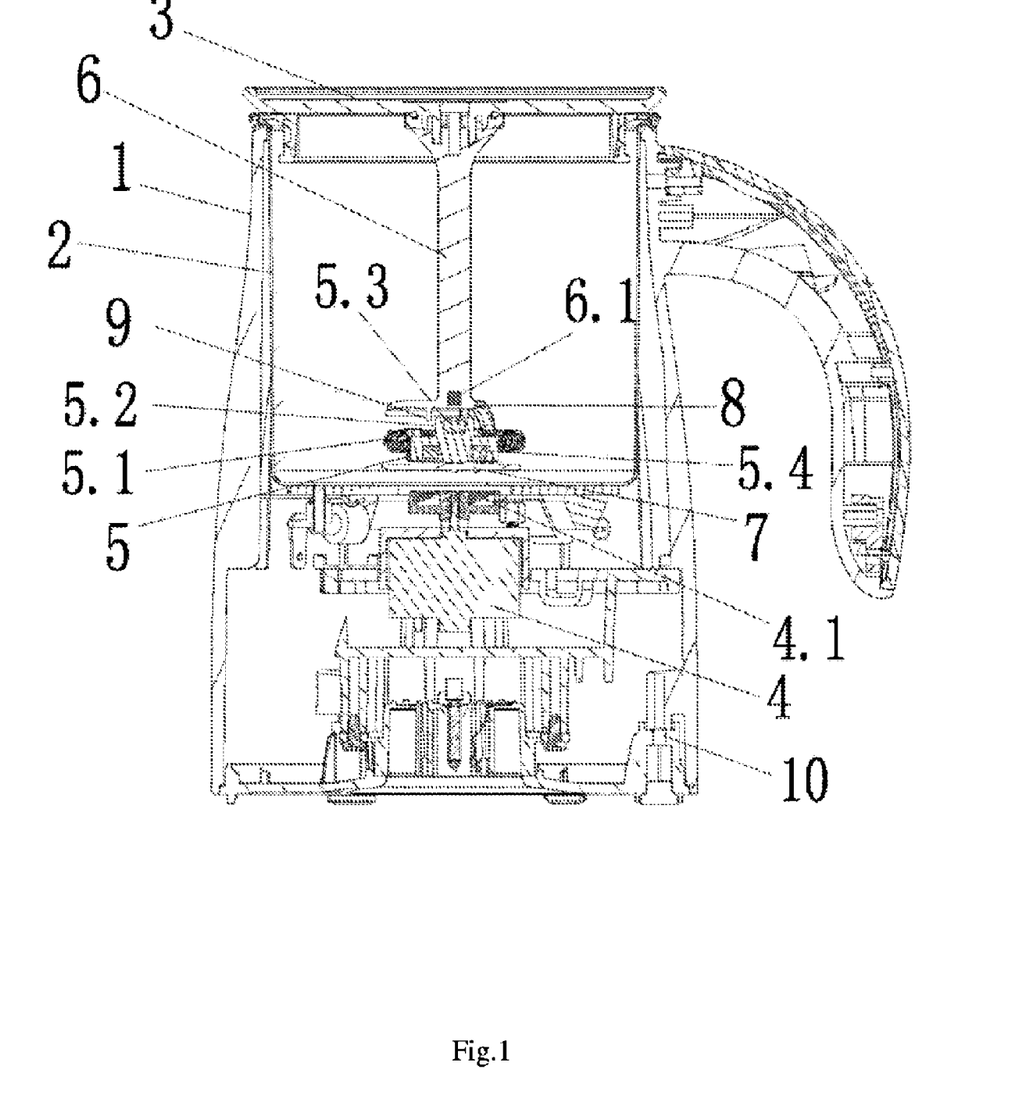
FIG. 1 is a schematic structural view of a liquid stirring apparatus according to a first preferred embodiment of the present invention.
Figure 2:
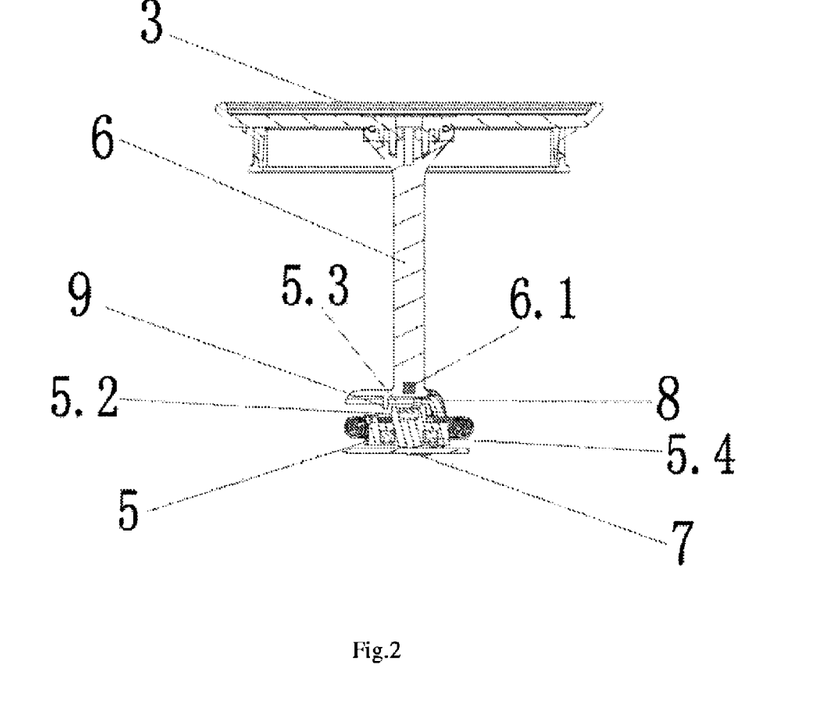
FIG. 2 shows the anti-friction bottom bracket, the anti-friction bottom part and the stirring head of the liquid stirring apparatus of FIG. 1.
Figure 3:
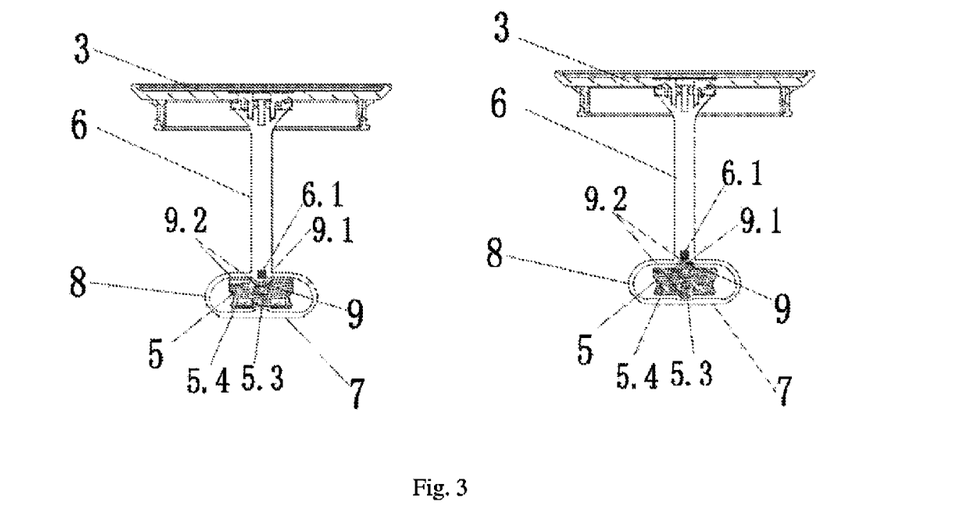
FIG. 3 shows arrangements of the anti-friction bottom bracket, the anti-friction bottom part and the stirring head of the liquid stirring apparatus of FIG. 1.
Figure 4:
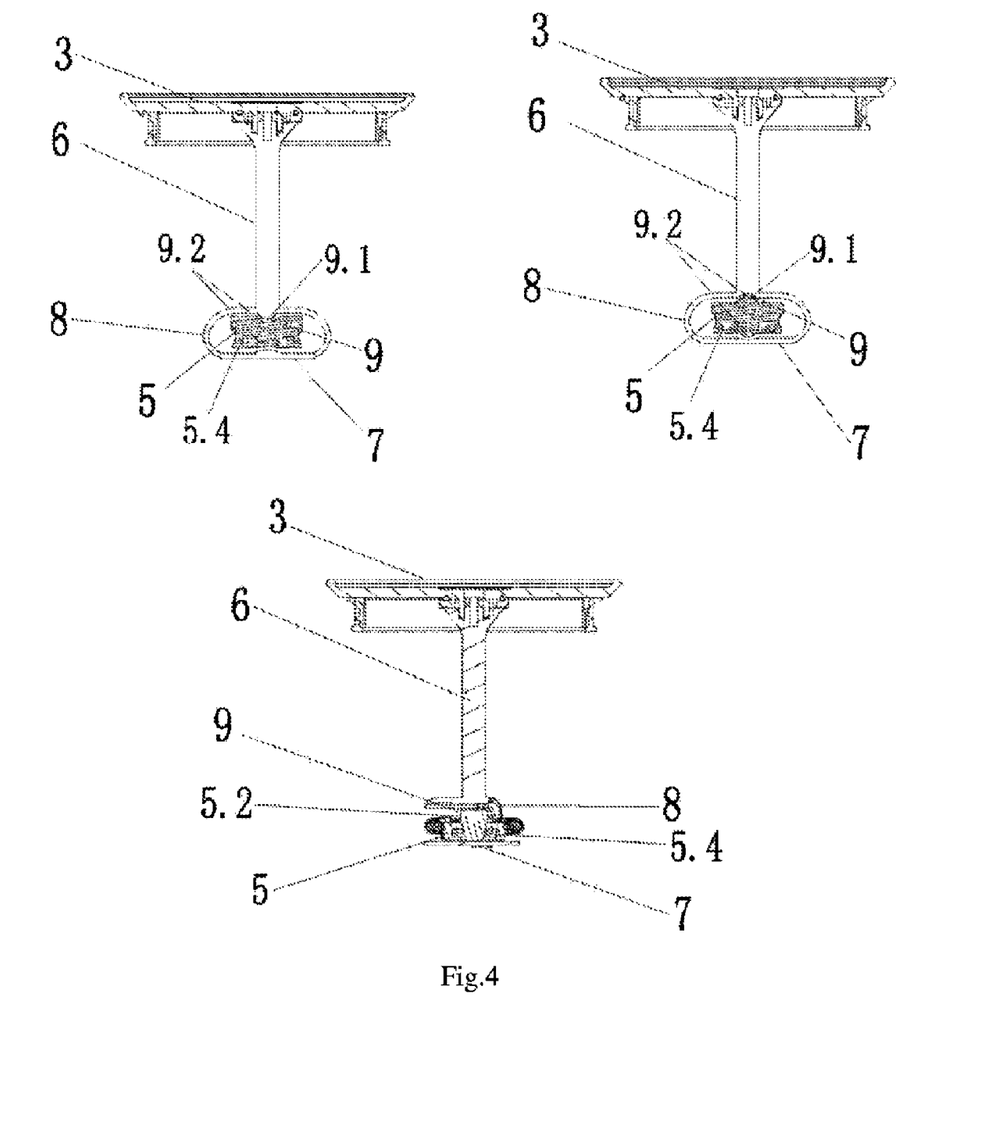
FIG. 4 shows other arrangements of the anti-friction bottom bracket, the anti-friction bottom part and the stirring head of the liquid stirring apparatus of FIG. 1.

In this embodiment, the apparatus further includes a power supply unit 10.

Referring now to FIGS. 5 to 8, a suspension type liquid stirring apparatus according to this embodiment comprises: a housing 11, a container 12, a container lid 13, a driving means 14, a stirring head 15, wherein the driving means 14 is arranged under the container 12, the stirring head 15 is disposed inside the container 12, wherein the apparatus further comprises an anti-friction bottom part 17 arranged between the stirring head 15 and the bottom of the container 12 so that the stirring head 15 does not wear out the bottom of the container 12 when the liquid stirring apparatus operates and the stirring head 15 rotates at high speed.

In this embodiment, the suspension type liquid stirring apparatus further includes an anti-friction bottom bracket 18 and the anti-friction bottom part 17 is positioned inside the container 12 by means of the anti-friction bottom bracket 18.

In this embodiment, the anti-friction bottom bracket 18 contains an anti-friction bottom bracket post 18.1, and there is a positioning means 19 located between the anti-friction bottom bracket post 18.1 and the stirring head 15, wherein the stirring head 15 is located inside the container 12 by means of the positioning means 19.

In this embodiment, the positioning means 19 consists of two or more protrusions 19.1 around the lower end of the anti-friction bottom bracket post 18.1, the stirring head 15 includes a stirring ring 15.1 and a stirring shaft 15.2 therein, the protrusions 19.1 being disposed inside of the stirring ring 15.1 and outside the stirring shaft 15.2.

In another embodiment, the positioning means 19 consists of male and female structures between the middle of the lower end of the anti-friction bottom bracket post 18.1 and the middle of the top of the stirring head 15, wherein there is one depression/protrusion 19.1 in the middle of the lower end of the suspension means 16, and there is one corresponding protrusion/depression 19.2 in the middle of the top of the stirring head interfitting with the depression/protrusion 19.1.

In this embodiment, there is one magnet means at the lower end of the anti-friction bottom bracket post 18.1 and the top of the stirring head 15 respectively, wherein the anti-friction bottom bracket post 18.1 and the stirring head 15 are coupled and positioned by means of the magnetic interaction between the magnet means 18.1.1 and the magnet means 15.3 thereof.

As a result, the anti-friction bottom bracket post 18.1 and the stirring head 15 are coupled together and positioned not only by the magnetic interaction between the magnet means 18.1.1 and the magnetic means 15.3, but also by means of the mechanical positioning means 19 between the anti-friction bottom bracket post 18.1 and the stirring head 15. As the suspension type liquid stirring apparatus operates with the stirring head 15 rotating at a constant speed, it is sufficient that the anti-friction bottom bracket post 18.1 and the stirring head 15 be coupled together and positioned by means of the magnetic interaction between the magnet means 18.1.1 and 15.3, however, the anti-friction bottom bracket post 18.1 and the stirring head 5 may swing irregularly when being washed by liquid, thus it may be not sufficient that the anti-friction bottom bracket post 18.1 and the stirring head 15 be only coupled together and positioned by means of the magnetic interaction between the magnet means 18.1.1 and 15.3, as a result it is necessary that the anti-friction bottom bracket post 18.1 and the stirring head 15 be coupled together and positioned by the mechanical positioning means 19 thereof.

Furthermore, as the anti-friction bottom bracket post 18.1 and the stirring head 15 are coupled together and positioned by the mechanical positioning means 19 thereof, the stirring head 15 will not be in contact with either the bottom of the container 12 or the anti-friction bottom bracket post 18.1 or the mechanical positioning means 19 when rotating, thereby the stirring head 15 experiences less friction when rotating, and the efficiency of operation is improved, on the other hand the stirring head 15 may be easily removed out of the stirring apparatus for cleaning.

In another embodiment, there is no magnet element arranged at the lower part of the anti-friction bottom bracket post 18.1 or the top of the stirring head 15, and the anti-friction bottom bracket post 18.1 and the stirring head 15 are merely coupled and positioned by the mechanical positioning means 19 of the anti-friction bottom bracket post 18.1 and the stirring head 15. The anti-friction bottom bracket post 18.1 and the stirring head 15 are positioned by means of the mechanical positioning means 19 thereof when the suspension type liquid stirring apparatus operates with the stirring head 15 rotating at a constant speed, as well as when the anti-friction bottom bracket post 18.1 and the stirring head 15 swing irregularly for being washed.

In this embodiment, there is at least one magnet means at the top of the driving means 14 and at least one at the lower end of the stirring head 15 respectively, wherein the stirring head 15 is driven by the magnetic force of the magnet means 14.1 of the driving means 14 and the magnet means 15.4 at the lower end of the stirring head 15, and the stirring head is positioned thereby and by means of the magnetic force of the magnet means 18.1.1 at the lower end of the anti-friction bottom bracket post 18.1.

In this embodiment, there is one or more positioning elements 18.2 on the anti-friction bottom bracket 18, wherein the positioning elements 18.2 are radially disposed, and the length thereof is slightly smaller than the radius of the container 12.

Figure 5:
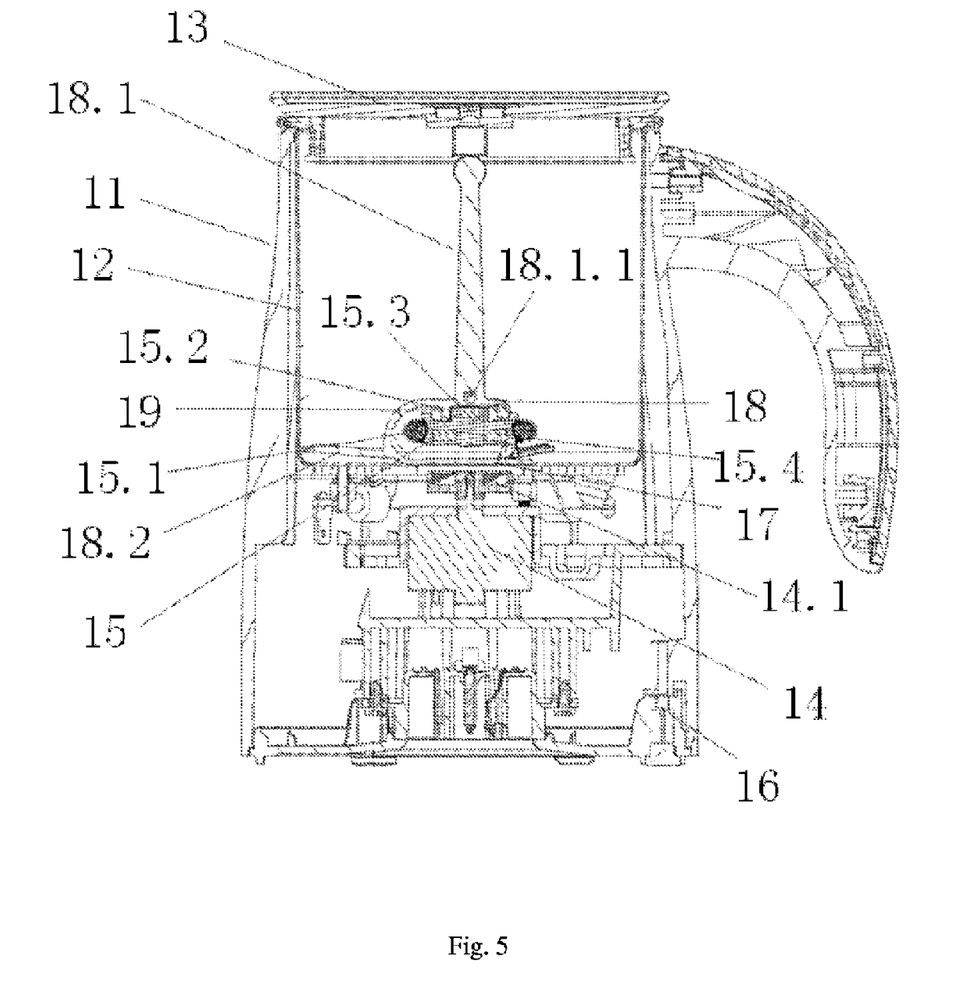
FIG. 5 is a schematic structural view of another liquid stirring apparatus according to a second preferred embodiment of the present invention.
Figure 6:
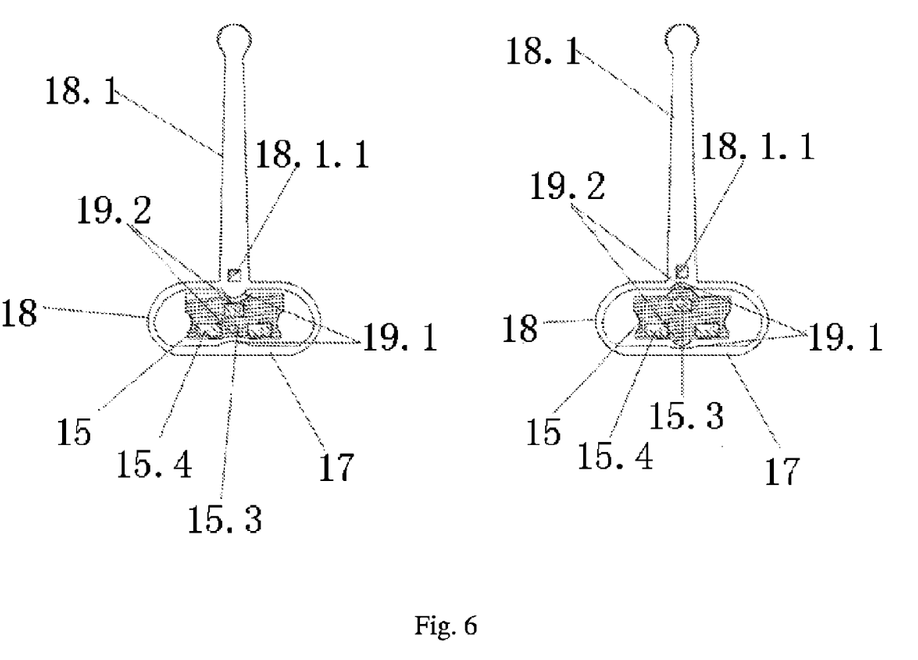
FIG. 6 shows the anti-friction bottom bracket, the anti-friction bottom part and the stirring head of the liquid stirring apparatus of FIG. 5.
Figure 7:
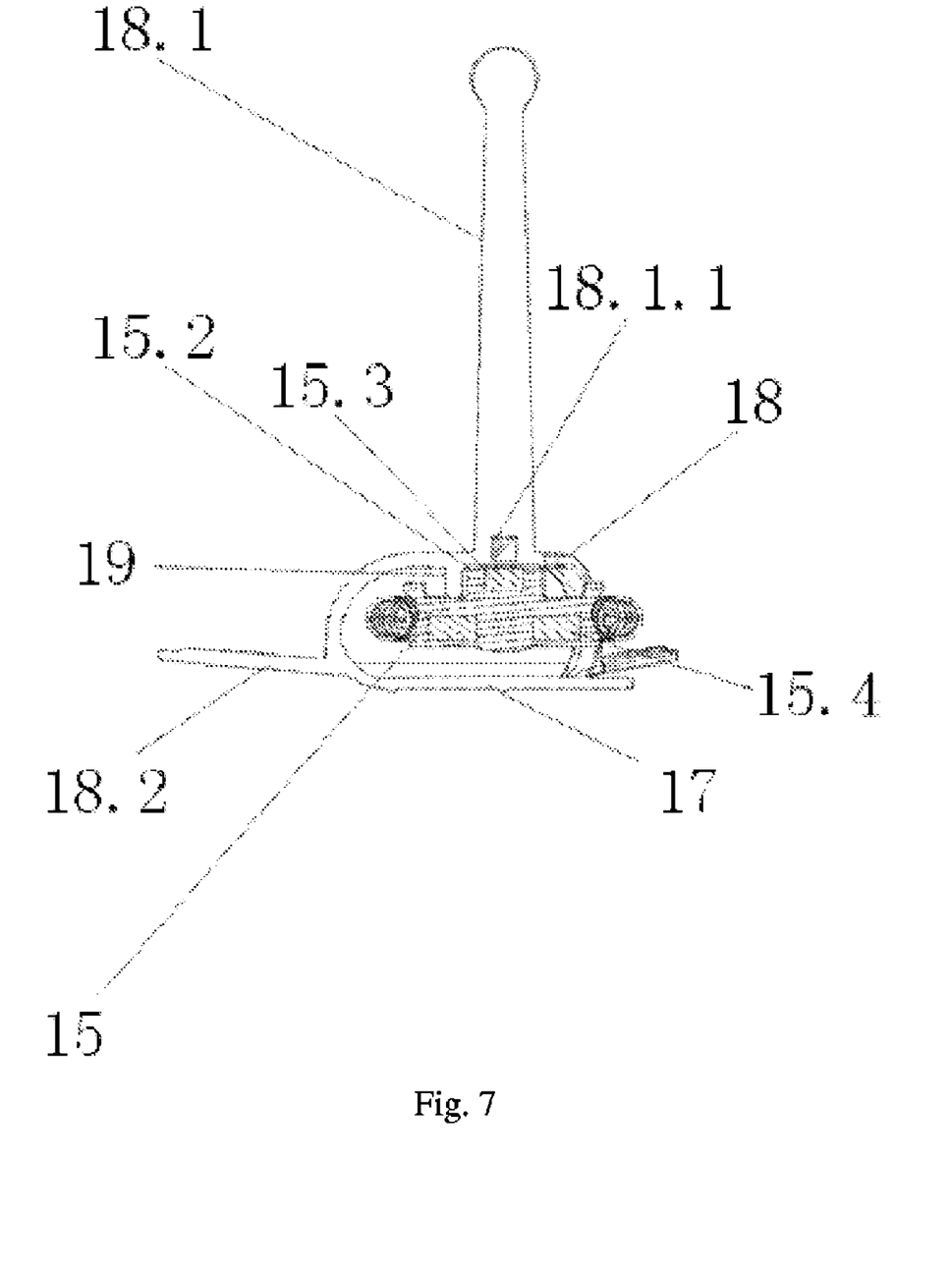
FIG. 7 shows arrangements of the anti-friction bottom bracket, the anti-friction bottom part and the stirring head of the liquid stirring apparatus of FIG. 5.
Figure 8:
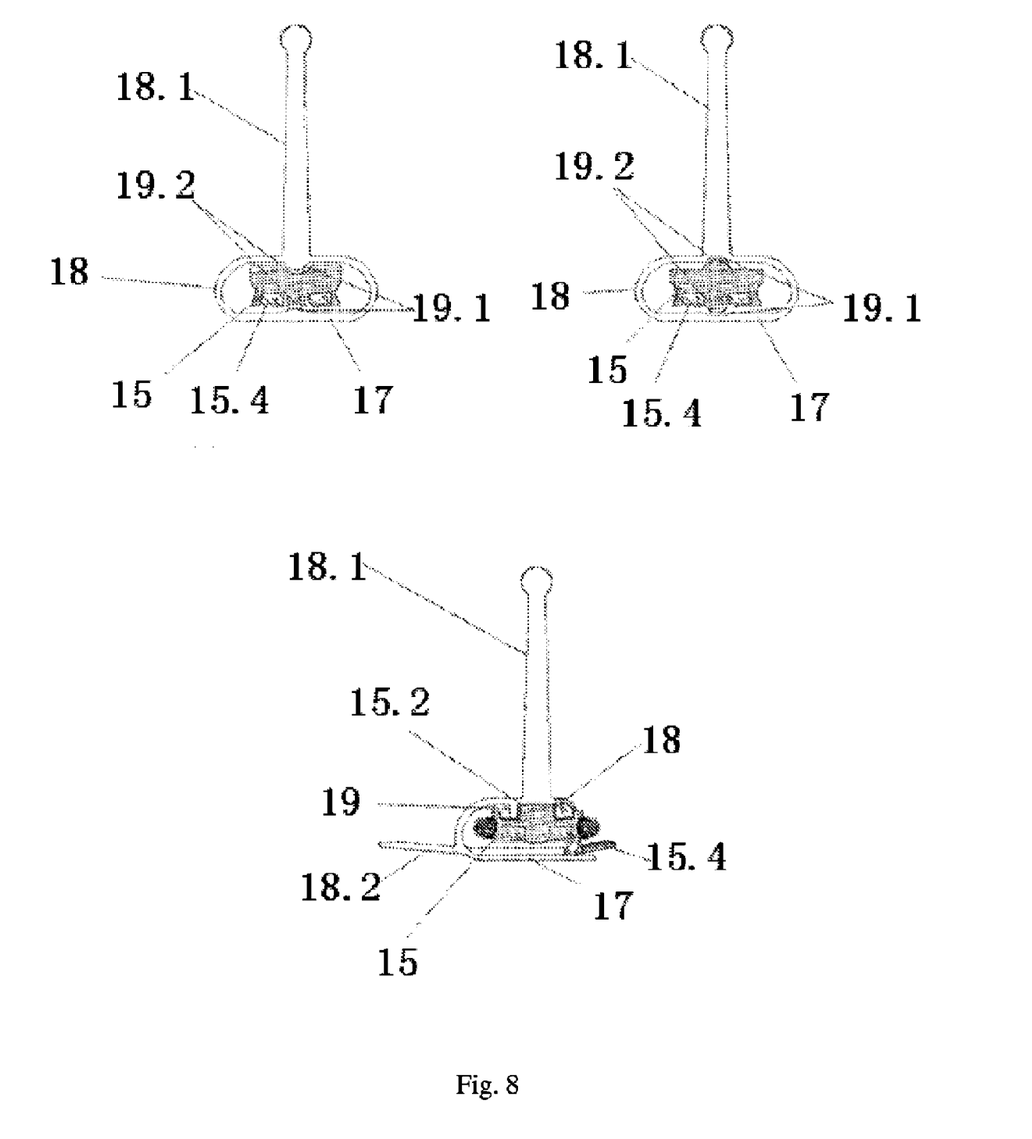
FIG. 8 shows other arrangements of the anti-friction bottom bracket, the anti-friction bottom part and the stirring head of the liquid stirring apparatus of FIG. 5.

In this embodiment, the apparatus further includes a power supply unit 16.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein.

Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

The invention claimed is:

1. A liquid stirring apparatus, comprising:
   a container for receiving a liquid to be stirred;
   a stirrer received within the container;
   a non-contact driving mechanism arranged externally of the container for driving the stirrer; and
   a holder for positioning the stirrer within the container, wherein the holder being not integral with the container;
   wherein the stirrer is retained in position within the holder by two or more protrusions extending outwardly of a wall of the holder, the stirrer comprises a stirring head having a stirring ring and a stirring shaft, the protrusions being disposed outside the stirring shaft and inside the stirring ring.

2. The liquid stirring apparatus of claim 1, wherein the non-contact driving mechanism and the stirrer are configured in such a way that the stirrer is driven by the driving mechanism through a magnetic drive effect.

3. The liquid stirring apparatus of claim 2, wherein the non-contact driving mechanism comprises an axially oriented magnetic drive.

4. The liquid stirring apparatus of claim 1, wherein the holder positions the stirrer adjacent a bottom wall of the container and the driving mechanism is positioned below the bottom wall of the container.

5. The liquid stirring apparatus of claim 1, wherein the bottom wall of the container does not have a deformed wall portion comprising a recess or relief associated with the driving mechanism.

6. The liquid stirring apparatus of claim 1, wherein the bottom wall of the container is substantially flat over its whole surface.

7. The liquid stirring apparatus of claim 1, wherein the holder is separate from the lid, but engages the lid when the holder is positioned within the container and the lid is placed on the container.

8. The liquid stirring apparatus of claim 1, wherein the holder has at least one member spaced outwardly therefrom which engages a wall of the container in order to position the stirrer within the container.

9. The liquid stirring apparatus of claim 8, wherein the holder has a plurality of members extending radially outwardly therefrom which each engage a cylindrical side wall of the container in order to position the stirrer within the container at a predetermined position adjacent a bottom wall of the container.

10. The liquid stirring apparatus of claim 1, wherein the holder is adapted to position the stirrer above a centre-point of the bottom wall of the container.

11. The liquid stirring apparatus of claim 1, wherein a surface of the holder which contacts with a wall of the container for positioning the stirrer within the container has an anti-slip means to reduce movement of the holder when the stirrer is being driven by the driving mechanism.

12. The liquid stirring apparatus of claim 1, wherein the stirrer is retained in position within the holder by a magnetic attraction of the stirrer to a wall of the holder.

13. The liquid stirrer apparatus of claim 12, wherein one of the stirrer or the holder has a magnet and the other of the stirrer or the holder has another magnet or a magnetic material element whereby magnetic attraction between the magnets or between the magnet and magnetic material element retains the stirrer in the holder.

14. The liquid stirring apparatus of claim 1, wherein the stirrer is retained in position within the holder by at least one depression/protrusion on a wall of the holder and a corresponding protrusion/depression in a middle of a surface of the stirring head which engages the depression/protrusion of the holder wall.

15. The liquid stirring apparatus of claim 1, wherein the stirrer is positioned by the holder adjacent a bottom wall of the container and a bottom of the stirrer is shaped to make minimal contact with either a top surface of the bottom wall of the container or a top surface of a bottom wall of the holder upon which the stirrer is supported when it is rotating.

16. The liquid stirring apparatus of claim 1, wherein the stirrer has at least one drive magnetic element or drive magnetic material element to enable the driving mechanism to cause said stirrer to rotate by a magnetic drive effect.

17. The liquid stirring apparatus of claim 16, wherein a strength of a magnetic attraction between the driving mechanism and the stirrer is greater than a strength of a magnetic attraction between the stirrer and the holder.

18. A method for preparing a froth from milk or a milk-based food liquid in an appliance according to claim 1, the method comprising driving the stirrer by a magnetic drive effect.

* * * * *